United States Patent Office

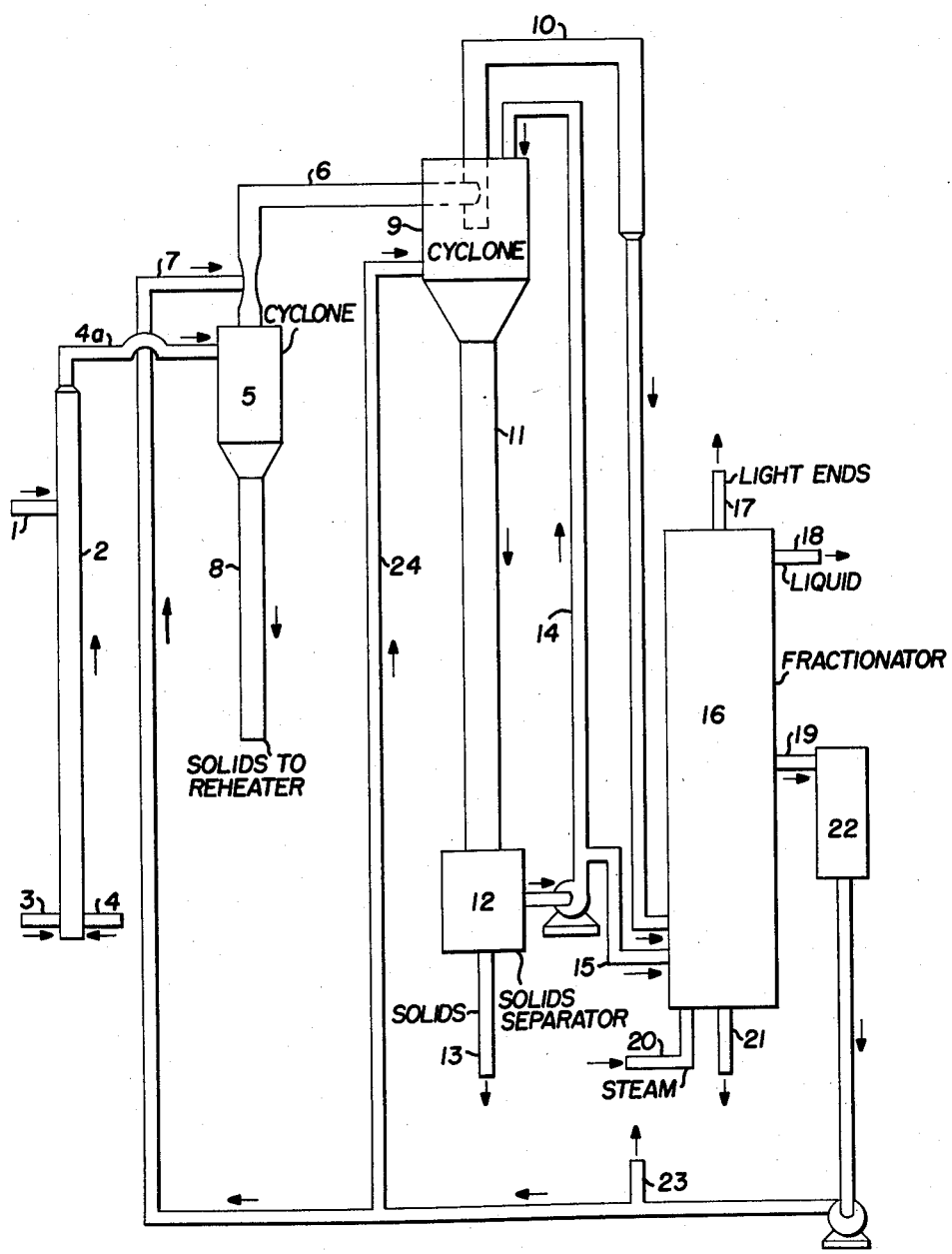

2,927,890
Patented Mar. 8, 1960

2,927,890

PRODUCT STREAM IN QUENCHING CONVERSION SYSTEM

William Joseph Metrailer, Baton Rouge, La., assignor to Esso Research and Engineering Company, a corporation of Delaware Application April 10, 1957, Serial No. 651,954

3 Claims. (Cl. 208—162)

This invention relates to improvements in the recovery of products from the high temperature conversion of hydrocarbons, particularly petroleum hydrocarbon oils. More particularly it relates to an improved method for preventing the loss of solids and the plugging of product recovery lines in a process of the nature indicated by using product hydrocarbon streams as quench and wash liquids.

In the prior art various proposals have been made for carrying out reactions by contacting gases, vapors and liquids with particulate solids flowing in the form of a fluidized, dispersed suspension in a transfer line. A particular application of this general technique relates to the coking or thermal conversion of heavy hydrocarbon oils to low molecular weight normally gaseous hydrocarbon unsaturates and coke, generally conducted at a temperature in the range of 1100° to 1800° F.

In the coking reactions particularly, the desired conversion ordinarily is accomplished by contacting the material to be converted with fluidized, i.e., a rapidly flowing stream, or dispersed suspension of preheated, finely divided, usually non-catalytic, solid particles such as coke, sand, etc. (As to nomenclature see Industrial & Engineering Chemistry, vol. 41, page 1249.) These particles may vary in size but ordinarily they range between about 20 and 80 micron particle diameter wtih a consequent wide difference in actual particle size in any given sample.

Heavy hydrocarbon oil feeds suitable for the process are reduced crudes, vacuum bottoms, pitch, asphalt, other heavy hydrocarbon residua or mixtures thereof. Typically such feeds can have an initial boiling point of about 700° F., an A.P.I. gravity of about 0° to 20°, e.g., 1.9°, and a Conradson carbon content of about 5 to 40 wt. percent. (As to Conradson carbon residue see A.S.T.M. Test D-189-41.) Gas, oils, naphthas and other petroleum fractions can also be utilized.

One of the problems encountered in systems of this nature is that the product stream from the vapor-solids separation device contains some entrained solids which are not easily removable. Upon cooling the product stream also contains highly unsaturated liquid products which tend to polymerize. These two materials tend to plug up downstream product lines leading to final product recovery systems. Expensive shutdowns can consequently be encountered.

This invention provides an improved method of overcoming these difficulties. The method comprises quenching the gaseous products downstream of a vapor-solids separation device by partially vaporizing a hydrocarbon liquid product produced in the system. The thus quenched stream is fed into a second cyclone vapor-solids separation device wherein the entrained solids, the unvaporized quench liquid and the condensed liquid product are separated therefrom. A major proportion of the combined liquid stream is recycled to the upper portion of the second vapor-solids cyclonic separation zone after the solids are separated therefrom so as to completely wet the surface thereof and wash down adhering solids. The build up of solids or coke on the walls of the equipment is thereby prevented. The uncondensed vapors from the second cyclone are then fractionated so as to segregate a first liquid product for use as the quench media. Further details are supplied below.

The first liquid hydrocarbon product used as a quench medium is so selected as to have certain definite characteristics. It contains from 1 to 20 vol. percent of a liquid which boils above the dew point of the gaseous product stream after quenching and has a final boiling point of from 50° to 100° F. above this dew point. Thus 80 to 99 volume percent of the quenching liquid media will be vaporized and rapidly cool the gaseous product stream sufficiently to terminate thermal cracking reactions. The unvaporized quench liquid will dilute the high boiling highly unsaturated products which condense out at quench temperatures. This dilution effect greatly reduces the tendency of these materials to polymerize.

The combined liquid streams utilized in the washing operation referred to previously is made up of the quenched condensate and unvaporized quench media. Solids entrained over with the gaseous products are separated in a standard solids-liquid settling device such as a settler or centrifuge and the clarified liquid is recycled to wash down the second cyclone. A relatively large quantity of washing liquid is required, therefore use of an internal stream is more desirable. Also, the final boiling point of the unvaporized quench media is only as high as required to have sufficient liquid present to dilute the high boiling, highly unsaturated condensed products. Use of the relatively low boiling diluent makes separation of the solids easier and simplifies handling of the wash liquid stream.

This invention will be better understood by reference to the flow diagram shown in the drawing.

Referring now to the flow diagram, a heavy residual petroleum oil, e.g. a South Louisiana reduced crude, at a temperature of 650° F. is introduced through line 1 into transfer line reactor 2. Hot coke solids at a temperature of 1600° F. from a heating zone, not shown, are also fed into the transfer line reactor through line 3. Fluidizing gas, e.g., steam, is fed in through line 4. The total contact time in the transfer line is about 0.2 to 0.4 second so as to obtain the desired reaction to ethylene, propylene, butadiene and other unsaturates. The effluent of coke particles and gaseous products is withdrawn through line 4a into a vapor-solids separation zone, typically a cyclone 5. The gaseous products along with some fine particles are withdrawn overhead through line 6, whereas the coarser solids are removed through line 8 to the heating zone. A first liquid hydrocarbon product is injected through line 7 into line 6 which cools the products from a temperature of 1400 F. to 550° F. Between 3 to 4 volumes of quench liquid are required per volume of heavy residual petroleum oil fed to the unit. Conditions of temperature and oil partial pressure after the quench point are such that the portion of the quench liquid stream boiling above 650° F. will not be vaporized. The first liquid hydrocarbon product used for quench is obtained by fractionation and is made up of 90% of a material boiling below 650° F. and 10% of a material boiling between 650° and 750° F. The quenched stream is then fed with a minimum of hold-up time into a second cyclonic vapor-solids separation zone 9. In cyclone 9 uncondenesd vapors are separated through line 10 from entrained solids, the quenched condensate and unvaporized quench media. The combined liquid stream is made up of about 5 parts of unvaporized quench media to 1 part of condensate. This liquid stream together with the entrained solids passes down the cyclone dipleg 11 and into a solids separator 12. The solids are withdrawn through line 13. Solids are removed by use of a conventional settling vessel or a centrifuge and a major proportion of the clarified liquid stream, i.e. 90 to 95 wt. percent, is pumped through line 14 into the upper portion of cyclone 9. It is there so distributed as to completely wash the wall surface thus preventing the build up of solids on the walls of the cyclone. Distribution of the liquid is accomplished by using multiple tangential liquid inlets at the very top of the cyclone. The excess second liquid product is fed through line 15 into fractionator 16. The uncondensed vapors from line 10 are fractionated to separate a light ends product boiling below the range of 380° to 430° F. which leave through line 17, a 430° to 650° F. liquid through line 18, and a first liquid product as heretofore described which is withdrawn through line 19. Steam is injected through line 20 to aid in the fractionation. A 650° F.+tar is withdrawn through line 21.

The first liquid product is accumulated in drum 22 and at least a portion thereof is pumped through line 7 as the quench media as described previously. A cycle oil product is withdrawn through line 23. A portion of the first liquid product can be sent through line 24 to a lower portion of cyclone 9 to help wash it down when solids carryover is excessive.

The conditions of transfer line coking of heavy hydrocarbon oils for chemicals are elaborated upon in the tables presented below because of the importance of this invention in that process. The conditions in the heater for a system of this nature are also indicated. In the heater coke particles can be combusted in the presence of an oxygen containing gas or extraneous fuels can be burnt or indirect heat exchange used to bring the solids up to the desired temperature.

*Conditions in transfer line reactor*

|  | Broad Range | Preferred Range |
| --- | --- | --- |
| Temperature, °F | 1,100–1,800 | 1,200–1,600 |
| Superficial Velocity of Fluidizing Gas, ft./sec | 5–150 | 25–60 |
| Contact Time, sec | 0.01–5.0 | 0.2–1.0 |

*Conditions in heater*

|  | Broad Range | Preferred Range |
| --- | --- | --- |
| Temperature, °F | 1,200–2,300 | 1,400–1,800 |
| Superficial Velocity of Fluidizing Gas, ft./sec | 0.2–150 | 25–60 |

The advantages of this invention will be apparent to the skilled in the art. The short contact time required in this process does not permit the use of multi-staged solids separating devices conventionally used with this type of system. The wetted wall cyclone prevents buildup of entrained solids in the conduits which lead to the product recovery system. It also provides a means of removing solids during periods of upset operation, e.g. high solids carryover. Inclusion of the relatively low boiling unvaporized liquid in the quench stream dilutes the very high boiling, highly unsaturated products and reduces their tendency to polymerize and form unmanageable material in the product conduits.

It is to be understood that this invention is not limited to the specific examples which have been offered merely as illustrations and that modifications may be made without departing from the spirit of the invention.

What is claimed is:

1. In a process of thermally converting a residual petroleum oil feed to lower molecular weight normally gaseous unsaturated hydrocarbons and coke by contacting the oil with a dispersed suspension of inert hot particulate solids in a conversion zone at a temperature between about 1200° F. and 1600° F., and separating the gaseous products from solids in a first, vapor-solids separation zone, the improvement which comprises the steps of quenching the separated gaseous products to a temperature of about 550° F. with a first hydrocarbon liquid product stream quench medium to a temperature sufficiently low to terminate the thermal conversion, said quench medium having about 90% by volume boiling below 650° F. and about 10% by volume boiling between about 650° F. and 750° F. and containing from 1 to 20 vol. percent of liquid which boils above the dew point of the gaseous product stream after quenching and having a final boiling point of from 50° to 100° F. above said dew point so that some liquid is present in said quenched stream; passing the quenched stream containing liquid into a second cyclonic liquid vapor-solids separation zone; separating uncondensed vapors from entrained solids and a liquid stream containing quenched liquid condensate and unvaporized liquid quench medium; separating the liquid stream from the solids; recycling a major proportion of the liquid stream to the upper portion of the second cyclonic liquid vapor-solids separation zone to wet the inner wall thereof and wash down adhering solids; fractionating the uncondensed vapors and residual proportion of the liquid stream to separate vapor products and distillate fractions therefrom, one of said distillate fractions including the first hydrocarbon liquid product stream quench medium and utilizing at least a portion thereof for the quenching step and passing another portion of the first hydrocarbon liquid product stream quench medium to a lower portion of the second cyclonic liquid-vapor-solids separation zone as an auxiliary liquid wash stream.

2. The process of claim 1 in which the particulate solids are coke solids.

3. The process of claim 1 in which the first liquid product stream employed for quenching is utilized in an amount of 3 to 4 volumes/volume petroleum oil feed.

References Cited in the file of this patent

UNITED STATES PATENTS

| 2,422,501 | Roetheli | June 17, 1947 |
| 2,698,672 | Burnside | Jan. 4, 1955 |
| 2,731,508 | Jahnig et al. | Jan. 17, 1956 |
| 2,735,804 | Boston et al. | Feb. 21, 1956 |
| 2,737,479 | Nicholson | Mar. 6, 1956 |
| 2,776,184 | Blanding | Oct. 9, 1956 |
| 2,776,727 | Boisture | Jan. 8, 1957 |
| 2,776,931 | Chaney et al. | Jan. 8, 1957 |
| 2,847,366 | Boisture | Aug. 12, 1958 |